US007557831B2

(12) United States Patent
Yamazaki

(10) Patent No.: US 7,557,831 B2
(45) Date of Patent: Jul. 7, 2009

(54) OPTICAL APPARATUS PROVIDED WITH IMAGE-SHAKE CORRECTION FUNCTION

(75) Inventor: Tatsuya Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 10/935,283

(22) Filed: Sep. 8, 2004

(65) Prior Publication Data

US 2005/0062852 A1 Mar. 24, 2005

(30) Foreign Application Priority Data

Sep. 18, 2003 (JP) ............................ 2003-325864

(51) Int. Cl.
*H04N 5/228* (2006.01)

(52) U.S. Cl. .................................................. 348/208.6

(58) Field of Classification Search ............. 348/208.6, 348/351, 352, 349, 208.1, 208.13; 396/51, 396/53, 55

See application file for complete search history.

(56) References Cited

U.S. PATENT DOCUMENTS 5,087,119 A * 2/1992 Kaneko et al. ............. 356/3.08
5,305,092 A * 4/1994 Mimura et al. .............. 356/609
5,585,884 A * 12/1996 Onuki ......................... 396/51
5,608,703 A * 3/1997 Washisu .................. 348/208.7
5,768,634 A * 6/1998 Nagai et al. ................... 396/54
5,949,481 A * 9/1999 Sekine et al. .......... 348/207.99
6,208,377 B1 3/2001 Morofuji et al. ............ 348/208
6,233,009 B1 5/2001 Morofuji et al. ............ 348/208
6,285,855 B1 * 9/2001 Tsuji .......................... 359/618
6,628,898 B2 * 9/2003 Endo ........................... 396/51
6,630,950 B1 * 10/2003 Ohkawara et al. ...... 348/208.12
6,933,968 B2 * 8/2005 Yamazaki ............. 348/208.12
7,113,204 B2 * 9/2006 Eto et al. ............... 348/208.99
7,286,753 B2 * 10/2007 Yamasaki .................... 396/51
2003/0063904 A1 * 4/2003 Mizumura ................... 396/55
2003/0142218 A1 * 7/2003 Yamazaki ................ 348/208.6
2004/0052513 A1 * 3/2004 Ohkawara et al. ............. 396/55
2005/0062852 A1 * 3/2005 Yamazaki ................ 348/208.6

FOREIGN PATENT DOCUMENTS

JP 6-165020 6/1994
JP 11-183951 7/1999
JP 11183951 * 7/1999
JP 11-183951 * 9/1999

OTHER PUBLICATIONS

Feb. 22, 2008 Office Action in Chinese counterpart application No. 200410078794.X and English translation thereof.

* cited by examiner

*Primary Examiner*—Tuan V Ho
*Assistant Examiner*—Kent Wang
(74) *Attorney, Agent, or Firm*—Fitzpatrick, Cella, Harper & Scinto

(57) ABSTRACT

It is an object of the present invention to provide an optical apparatus which can avoid the movement of an unnatural image by an image-shake correction function. An optical apparatus comprises a controller which performs an image-shake correcting control based on a signal generated by using an output of a shake detector which detects a shake. The controller performs filtering processing and integrating processing to the signal. The controller changes a cutoff frequency in the filtering processing and the integration constant according to the information on a focal length of an image-taking optical system which forms an object image and information on the object distance.

28 Claims, 14 Drawing Sheets

101 102 103 105
CAMERA SIGNAL PROCESSING SECTION
IMAGE SIGNAL
122 M 124 M
CCD DRIVE CIRCUIT 104
LINE MEMORY 106
MEMORY CONTROL CIRCUIT 107
ZOOM MOTOR DRIVER 123
FOCUS MOTOR DRIVER 125
121 120 119
LENS SYSTEM CONTROL PORTION
CORRECTION SYSTEM CONTROL PORTION
ANGULAR VELOCITY SENSOR 111
HPF 112
Amp 113
A/D 114
HPF 115
PHASE COMPENSATING 116
VARIABLE HPF 117
INTEGRATOR 118

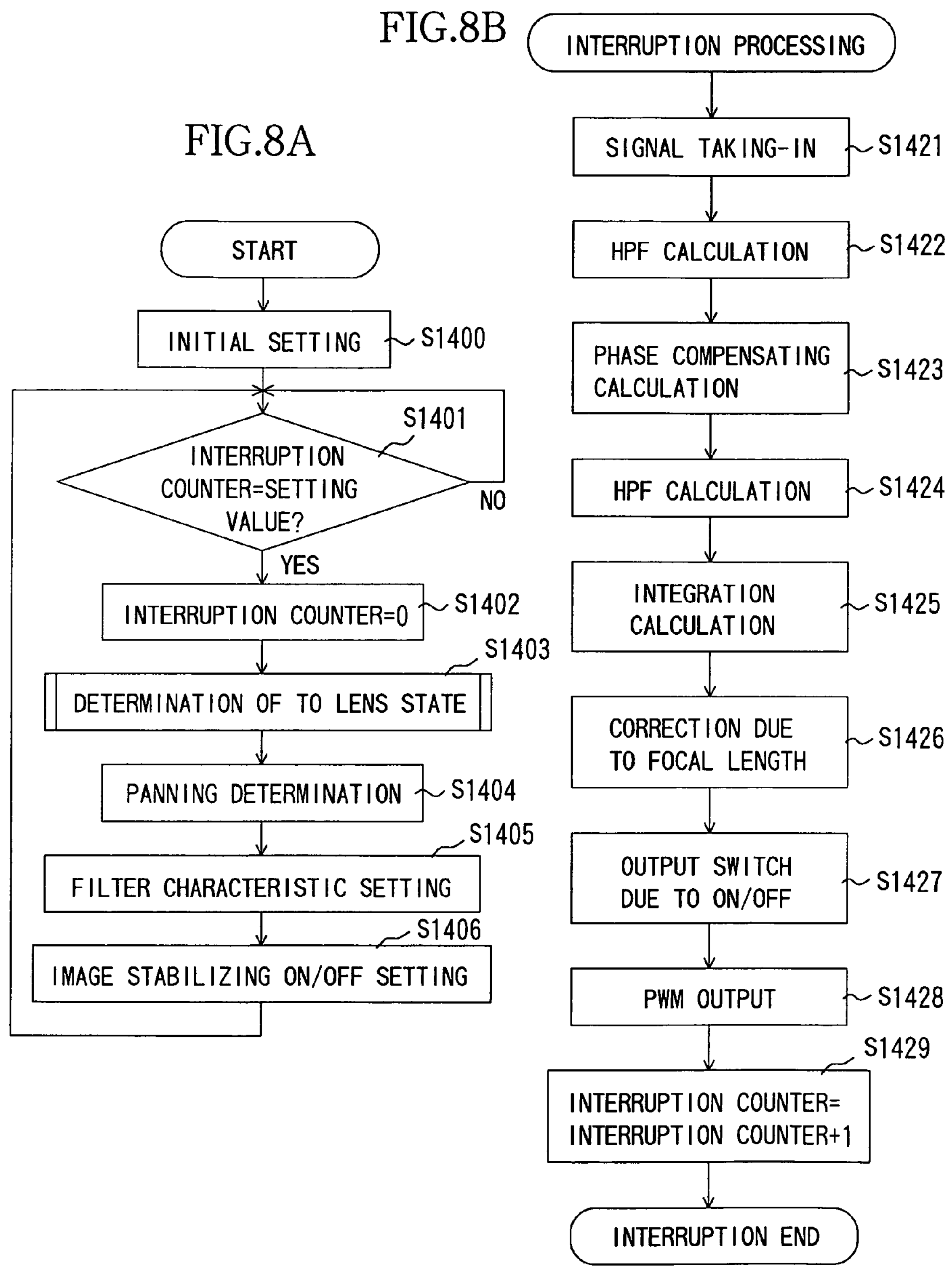
FIG.8B
INTERRUPTION PROCESSING
SIGNAL TAKING-IN
S1421
HPF CALCULATION
S1422
PHASE COMPENSATING CALCULATION
S1423
HPF CALCULATION
S1424
INTEGRATION CALCULATION
S1425
CORRECTION DUE TO FOCAL LENGTH
S1426
OUTPUT SWITCH DUE TO ON/OFF
S1427
PWM OUTPUT
S1428
S1429
INTERRUPTION COUNTER= INTERRUPTION COUNTER+1
INTERRUPTION END
FIG.8A
START
INITIAL SETTING
S1400
S1401
INTERRUPTION COUNTER=SETTING VALUE?
NO
YES
INTERRUPTION COUNTER=0
S1402
S1403
DETERMINATION OF TO LENS STATE
PANNING DETERMINATION
S1404
S1405
FILTER CHARACTERISTIC SETTING
S1406
IMAGE STABILIZING ON/OFF SETTING S1200
IS THE FOCUS LENS NEAR THE FOCUSING POINT?
NO
YES
S1201
IS A FOCAL LENGHT A PREDETERMINED VALUE OR GREATER?
NO
YES
S1202
IS AN OBJECT DISTANCE A PREDETERMINED VALUE OR GREATER?
NO
YES
S1203
THE INTEGRATION CONSTANT IS SET TO A VALUE CORRESPONDING TO A FOCAL LENGTH AND AN OBJECT DISTANCE
S1204
THE INTEGRATION CONSTANT IS SET TO A VALUE AT THE TIME OF A NORMAL CONTROL

OPTICAL APPARATUS PROVIDED WITH IMAGE-SHAKE CORRECTION FUNCTION

BACKGROUND OF THE INVENTION

1. Field of the Invention

The present invention relates to an optical apparatus such as an interchangeable lens and an image-taking apparatus having a function for correcting image-shake caused by shake.

2. Description of Related Art

Conventionally as an image-shake correction function mounted in an optical apparatus such as a video camera, for example, a so-called electronic shake correction method which detects a shake of a device (a camera shake) by using a shake detector with an angular velocity sensor and an angular acceleration sensor or the like and is changed a reading area of a signal from an image-pickup device based on the shake.

As another example, a so-called optical shake correction method which detects the shake of the device by using the above mentioned shake detector and the lens is moved substantially perpendicular to an optical axis direction based on the shake to make the optical axis eccentric.

In either shake correction method, the output (amplified signal) from the shake detector removed a lower frequency component than a cutoff frequency via a highpass filter (hereinafter, referred to as "HPF"), and a shake correction amount is calculated by integrating a higher frequency component than the cutoff frequency using an integrator.

When the above mentioned electronic or optical shake correction is performed, even if the shake amount is equal, the correction amount differs according to a focal length of the image-taking optical system. For example, if the same correction amount as the amount of correction to a shake amount of 0.3 deg in a telephoto end of a ten-time zoom lens is given at a wide-angle end, the correction amount corresponds to the shake amount of 3.0 deg.

Therefore, a steady hand shake correction control can be performed by performing the correction according to the focal length to the output of the integrator based on focal length information of the lens without depending on the focal length.

In addition, if a normal shake correction control is performed when an user performs a panning (or a tilting), it is detected as a shake, so image-shake is not generated by performing the shake correction control immediately upon performing the panning. However, a discontinuous feeling is caused in the movement of the image as the image starts to move suddenly, when the panning is performed further, the shake amount has exceeded the range in which the shake correction control can be performed. In addition, the state of shake correction is maximum during the panning, and the shake correction to the hand shake during the panning cannot be performed. Therefore, a panning control is performed so as to avoid such an inconvenience.

In the panning control, for example, the cutoff frequency of HPF is changed higher in the case where the output of the integrator exceeds the range determined previously, and the shake amount that the shake correction control has started is increased (Japanese Patent Application Laid-Open No. H6-165020 and H11-183951).

FIG. 15 shows the relationship between the magnitude (magnitude size of the output of the integrator) of the shake amount and the cutoff frequency of HPF during the panning control. The line in FIG. 15 shows the appearance that the cutoff frequency of HPF is changed according to the change in the integrator output. When the integrator output exceeds a predetermined value A, the cutoff frequency is increased as the magnitude of the integrator output grows.

Thus, the shake correction control is limited during panning by changing the cutoff frequency according to the magnitude of the integrator output, and as a result, the movement of an image near an intention of the user can be obtained.

By the way, a method for changing the integration constant is used besides a method for changing the cutoff frequency of HPF as a panning control.

However, the large magnification of the lens is advanced, and the focal length of the lens exceeds 1000 mm on the telephoto end. Since the panning speed slows remarkably when such a lens near the telephoto end is used and an object of shooting exists at a very far distance, it is not possible to shift from a normal hand shake correction control to the panning control smoothly. Therefore, a normal hand shake correction control is executed during the panning, as a result, the object image shakes from side to side and the image which is unnatural or has a sense of discomfort will be taken.

SUMMARY OF THE INVENTION

It is an object of the present invention to provide an optical apparatus which can avoid a movement of an unnatural image by the image-shake correction function.

An aspect of the invention is an optical apparatus comprises a controller which performs an image-shake correcting control based on a signal generated by using an output of a shake detector which detects a shake. The controller performs filtering processing to the signal and changes a cutoff frequency in the filtering processing according to information on a focal length of an image-taking optical system which forms an object image and information concerning the object distance.

Another aspect of the invention is an optical apparatus comprises a controller which performs an image-shake correcting control based on a signal generated by using an output of a shake detector which detects a shake. The controller performs integrating processing to the signal and changes an integration constant in the integrating processing according to information on a focal length of an image-taking optical system which forms an object image and information on a object distance.

The features of the optical apparatus of the present invention will become more apparent from the following embodiments with reference to the accompanying drawings.

BRIEF DESCRIPTION OF THE DRAWINGS

FIGS. 8A and 8B show flowcharts of an optical image-shake correction control in the image-taking apparatus according to Embodiment 2.

DETAILED DESCRIPTION OF THE PREFERRED EMBODIMENTS

Now, with reference to the figures, preferred embodiments of the present invention are detailed below.

Embodiment 1

Figure 1:
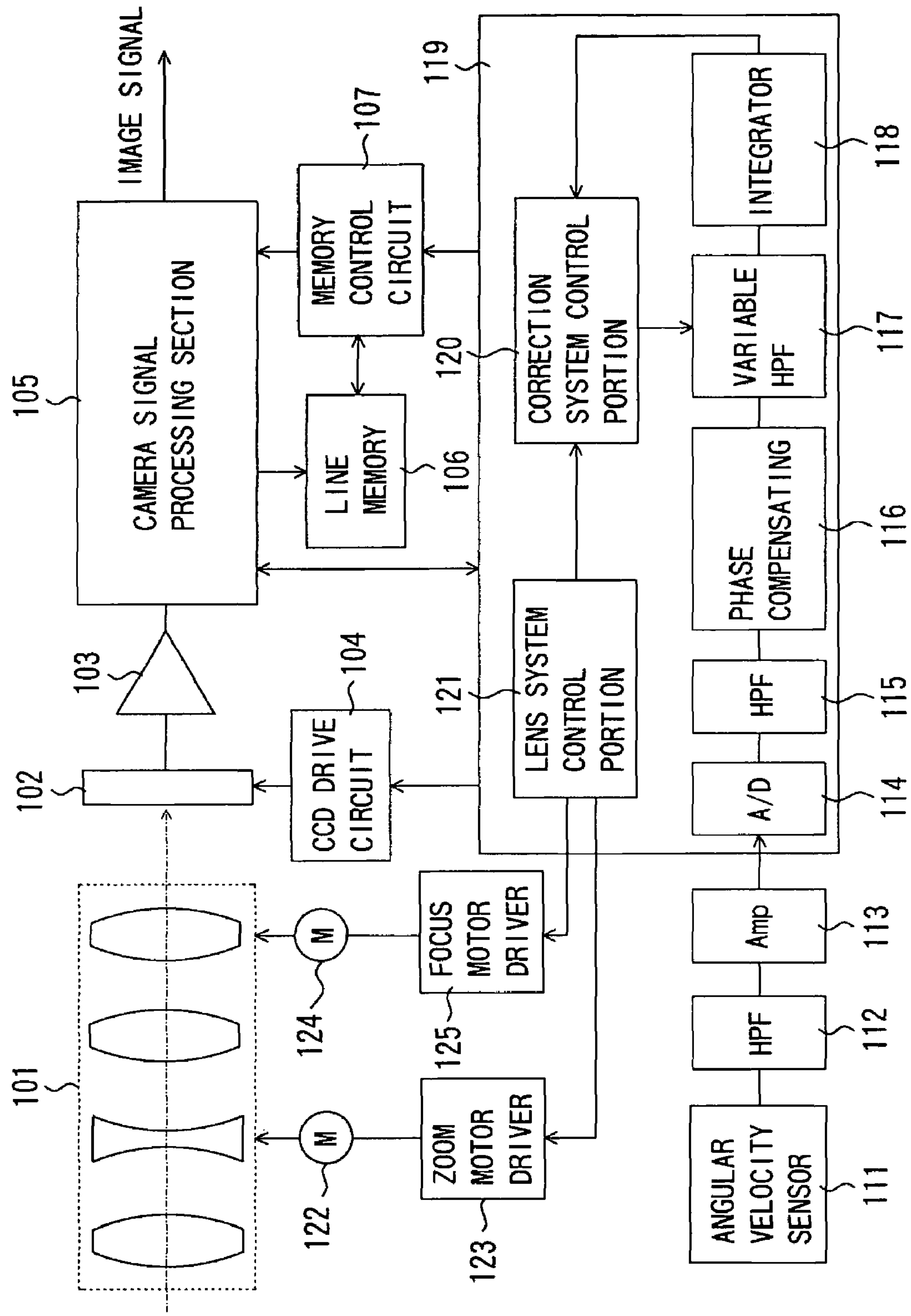
FIG. 1 shows a block diagram of a structure of an image-taking apparatus according to Embodiment 1 of the present invention.

FIG. 1 shows the structure of an image-taking apparatus (optical apparatus) such as a video camera provided with an electronic image-shake correction function according to Embodiment 1 of the present invention.

In FIG. 1, Reference Numeral 101 denotes an image-taking optical system and Reference Numeral 102 denotes a solid-state image-pickup device (a CCD sensor and a CMOS sensor or the like, hereinafter, referred to as "CCD"). An object image is imaged on the CCD 102 by the image-taking optical system 101, and the object image is photoelectrically converted in the CCD 102. Herein, the CCD 102 applies a CCD having many pixels compared to a standard CCD which is necessary for a broadcasting method such as an NTSC method.

Reference Numeral 104 denotes a CCD drive circuit which drives the CCD 102. The CCD drive circuit 104 can select whether to segment (read) an area finally output from which line of the CCD 102 on a vertical synchronization direction, according to a control instruction from the following camera system control microcomputer (hereinafter referred simply to as a microcomputer) 119.

Figure 13:
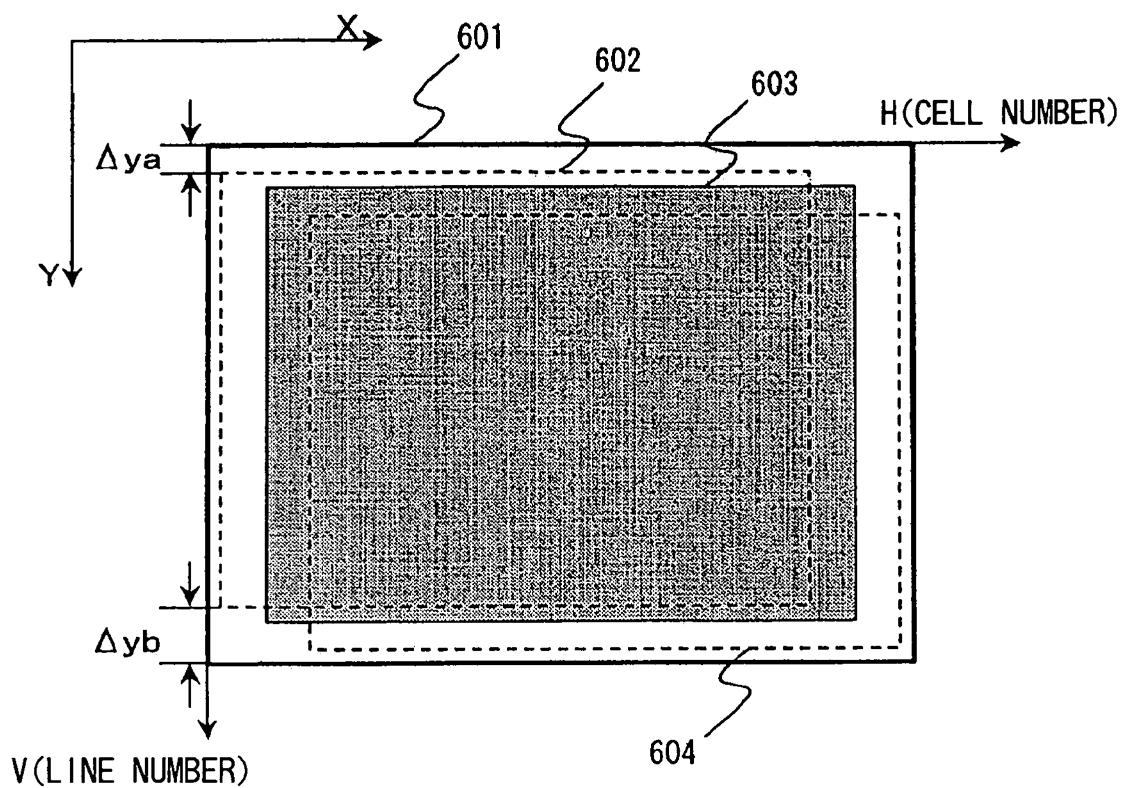
FIG. 13 shows the segmented range of an image during the electronic image-shake correction.

Herein, FIG. 13 represents an imaging area of a CCD. In FIG. 13, Reference Numeral 601 denotes an entire imaging area of the CCD, and Reference Numerals 602, 603 and 604 denote an area showing a broadcasting method standard size. Among there, when a shake correction is not performed, the area 603 which is a center is segmented and output an image. When a shake correction is performed, the area segmented such that the shake is removed according to the signal from a shake detector is output is moved to the area 602 or the area 604 or the like, and the image is output.

Particularly, for example, when the segmented area is from an uppermost line to the ya+1 line under Δya line, Δya line is read out at high speed, and is read out from ya+1 at the same timing as the case using a CCD of a standard magnitude for the vertical synchronizing signal. And the area of standard image size can be actually segmented on the vertical synchronization direction by reading out the remaining Δyb line at high speed again.

Returning to FIG. 1, Reference Numeral 103 denotes an analog signal processing section, and the predetermined processing is applied to the signal obtained by the CCD 102 to generate an analog image-pickup signal. For instance, the analog signal processing section 103 is composed of a CDS circuit (an e correlated double sampling circuit) and an AGC circuit or the like.

Reference Numeral 106 denotes a memory, and a digital image-pickup signal can be stored at least one line via a memory control circuit 107. In addition, the digital image-pickup signal can be read from the predetermined position (address) of the memory 106.

Reference Numeral 105 denotes a camera signal processing section in which an A/D converter is incorporated, and which executes digital signal processing, and the camera signal processing section 105 generates a final output image signal The digital image-pickup signal stored in the memory 106 has more pixels than that of the standard image size. The memory control circuit 107 can select the first pixel read from the memory. 106 according to the control instruction of a microcomputer 119, and reads only by the standard image size.

The microcomputer 119 performed the CCD drive circuit 104, the exposure control, the white balance control, the magnification varying lens control, the auto focus control, the image stabilizing control, and the entire camera system control. However, only a part which mainly concerns shake correction is shown in FIG. 1.

Reference Numeral 111 denotes an angular velocity sensor, and the angular velocity sensor 111 detects the shake of the image-taking apparatus. Reference Numeral 112 denotes a highpass filter (HPF), and the highpass filter 112 segments the DC components of the output of the angular velocity sensor 111. Reference Numeral 113 denotes an amplifier, and the angular velocity signal detected is amplified. Though the shake detection system such as the angular velocity sensor 111 is separately arranged in the pitch (vertical) direction and in the yaw (horizontal) direction, FIG. 1 shows only the shake detection system of one axial direction. In whichever axial direction, the structure of the shake detection system is same.

Reference Numeral 114 denotes an A/D converter incorporated in the microcomputer 119, and the angular velocity signal in two axes directions is converted into a digital signal by the A/D converter 114 to become angular velocity data. A predetermined signal processing is applied to the angular velocity data by the HPF 115 and the phase compensating filter 116. After the highpass filter processing is performed by the cutoff variable HPF 117 which can vary the cutoff frequency, the shake correction signal in the pitch direction and the yaw direction is generated by the integrator 118.

Reference Numeral 120 denotes a correction system control portion. The correction system control 120 transmitted the shake correction signal in the pitch direction to the CCD drive circuit 104 and transmitted the shake correction signal in the yaw direction to the memory control circuit 107 for the shake correction signal generated.

As described above, the CCD drive circuit 104 and the memory control circuit 107 change the reading area (segmented area) of the signal from the entire image-pickup area 601 respectively according to the shake correction signal, and thereby the image-shake correction is performed.

Reference Numeral 121 denotes a lens system control portion provided in the microcomputer 119, and the lens system control portion 121 controls and drives a zoom lens and a focus lens arranged in a lens unit 101. The lens system control portion 121 moves the zoom lens by controlling a zoom motor 122 via a zoom motor driver 123 to perform a magnification varying operation. At the lens system control portion 121 performs focusing operation by controlling a focus motor 124 via a focus motor driver 125 and move a focus lens. In this embodiment, a stepping motor is used as a motor, and the position of the lens is detected by managing a driving pulse in the lens system control portion 121 when the motor is driven.

A DC motor and a linear motor can be also used as a motor, and, in this case, the position of the lens can be detected by separately arranging an encoder. In addition, the focal length of the current lens unit 101 is obtained from the positional information of the zoom lens detected.

A correction control portion 120 corrects the shake correction signal which is output from the integrator 118 according to the focal length based on the focal length information detected in the lens system control portion 121, and calculates the final shake correction amount. As described above, the final shake correction amount is transmitted to the CCD drive circuit 104 and the memory control circuit 107, and the shake correction is performed.

Figure 2A:
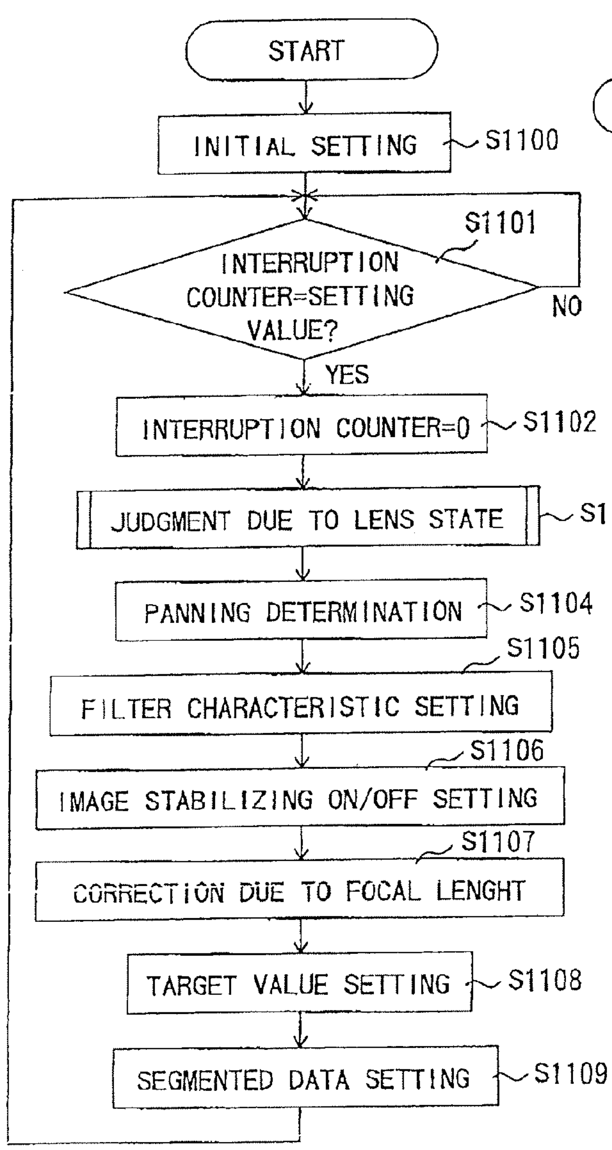
FIGS. 2A and 2B show a flowchart of an electronic image-shake correction control in the image-taking apparatus according to Embodiment 1.
Figure 2B:
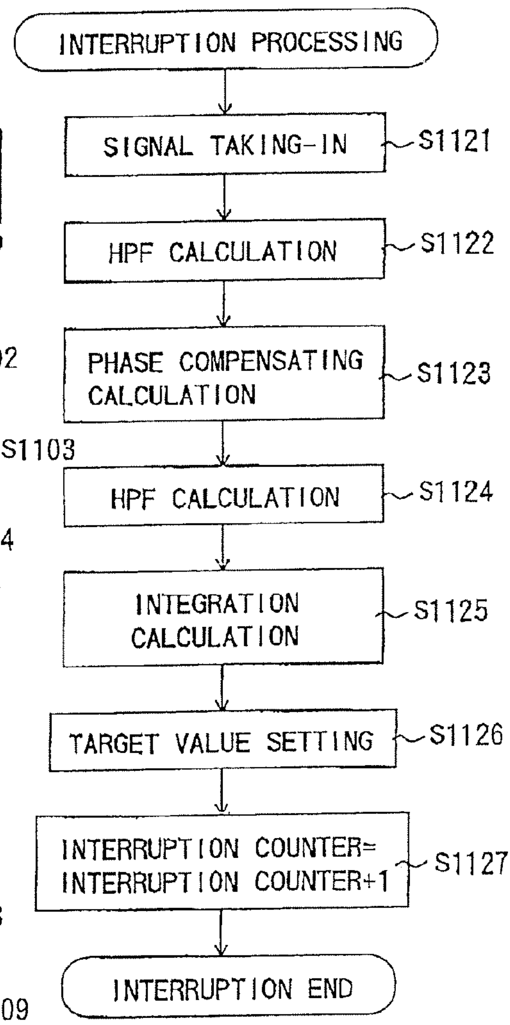
Figure 3:
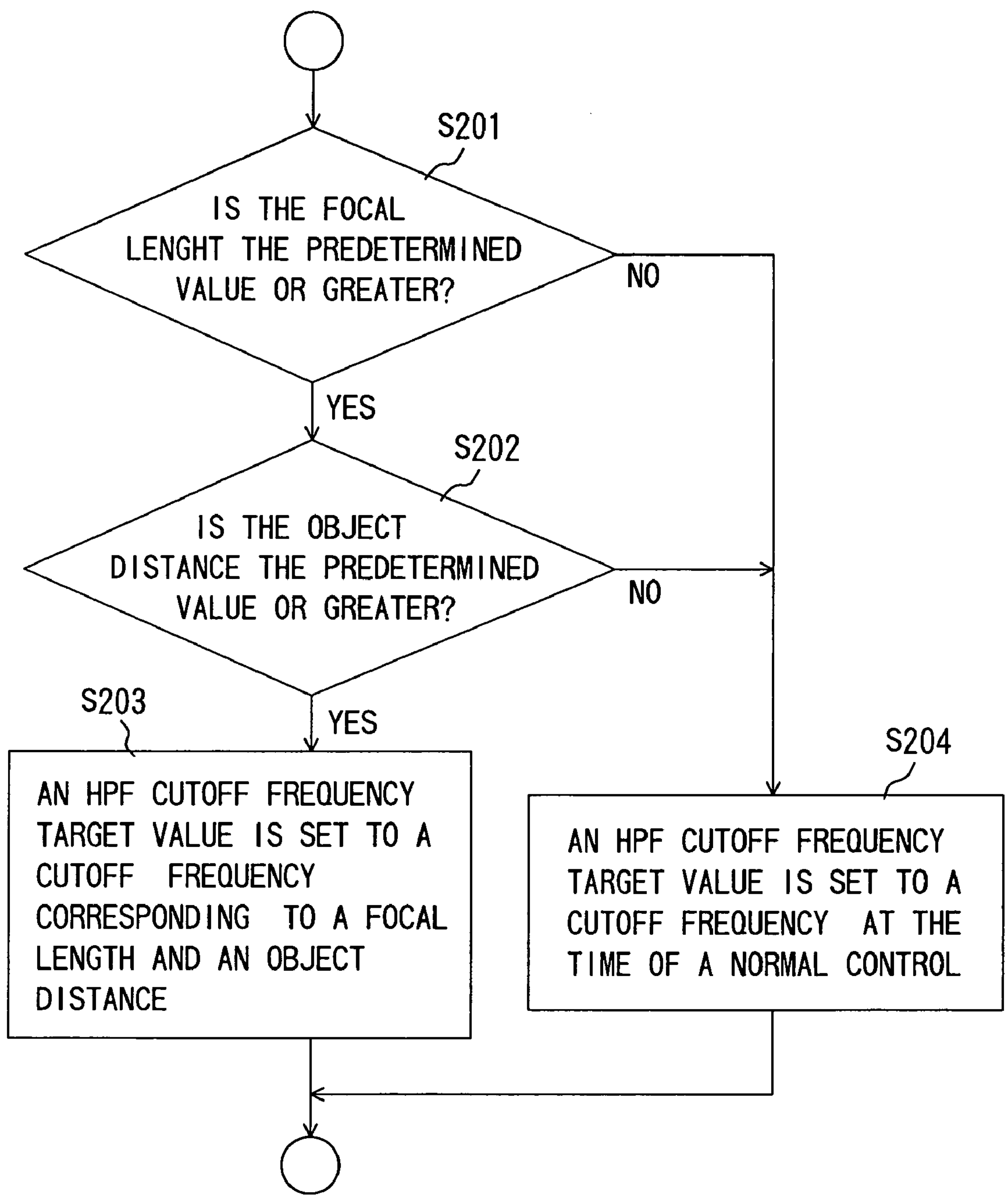
FIG. 3 shows a flowchart of a lens state determination operation executed in step S1103 of FIG. 2A.

FIGS. 2A and 2B show a flowchart of an electronic image-shake correction control executed in the microcomputer 119 according to Embodiment 1, and FIG. 3 shows a filter characteristic executed in the operation of FIGS. 2A and 2B, and in a word, a flowchart of a part concerning the change in the characteristic of the image-shake correction control. In this Embodiment 1, the cutoff variable HPF 117 is used as a filter which changes the characteristics.

Steps S1100 to S1109 of FIG. 2A show a main processing, and steps S1121 to S1127 of FIG. 2B show an interruption processing. Herein, the main processing is performed once in the vertical synchronizing period of a television signal.

First, when power is supplied to the image-taking apparatus in step S1100 in the main processing of FIG. 2A, an initial setting is performed. Herein, setting such as an interruption cycle is performed.

Next, it is determined whether an interruption counter attains a set value in step S1101. A wait processing is to be performed in step S1101 until the interruption processing of a predetermined number is performed (processing in FIGS. 2A and 2B).

Although the interruption processing is influenced by the processing performance of the microcomputer, the interruption processing is performed by timers of 900 Hz or 480 Hz. The frequency is set so as to synchronize with the main processing performed once during the vertical synchronizing period. In the interruption processing of FIG. 2B, first, an output signal of the angular velocity sensor 111 is taken in step S1121.

An HPF calculation is performed by the HPF 115 shown in FIG. 1 in the following step S1122, and a phase compensating calculation is performed by a phase compensating filter 116 shown in FIG. 1 in the following step S1123. In following step S1124 the HPF calculation which changes the cutoff frequency by the HPF 117 which can vary the cutoff shown in FIG. 1, and the integration calculation is performed by the integrator 118 shown in FIG. 1 in the following step S1125.

In the following step S1126, the image-shake correction target value (a shake correction signal) by using the data taken in the interruption processing is calculated, the number of the interruption processing is counted in the following step S1127, and the interruption processing is ended.

When the above interruption processing is executed by a predetermined number which is set previously, in the main processing, the process proceeds to step S1102 from the step S1101, and the interruption counter is cleared. The state of the lens unit is determined in the following step S1103. The processing in step S1103 is a processing shown in FIG. 3.

In FIG. 3, in step S201, it is determined whether a present focal length is greater than a predetermined value (a first predetermined value), and if so, the process proceeds to step S202. Then, it is determined whether the object distance is greater than a predetermined value (a second predetermined value).

Figure 4:
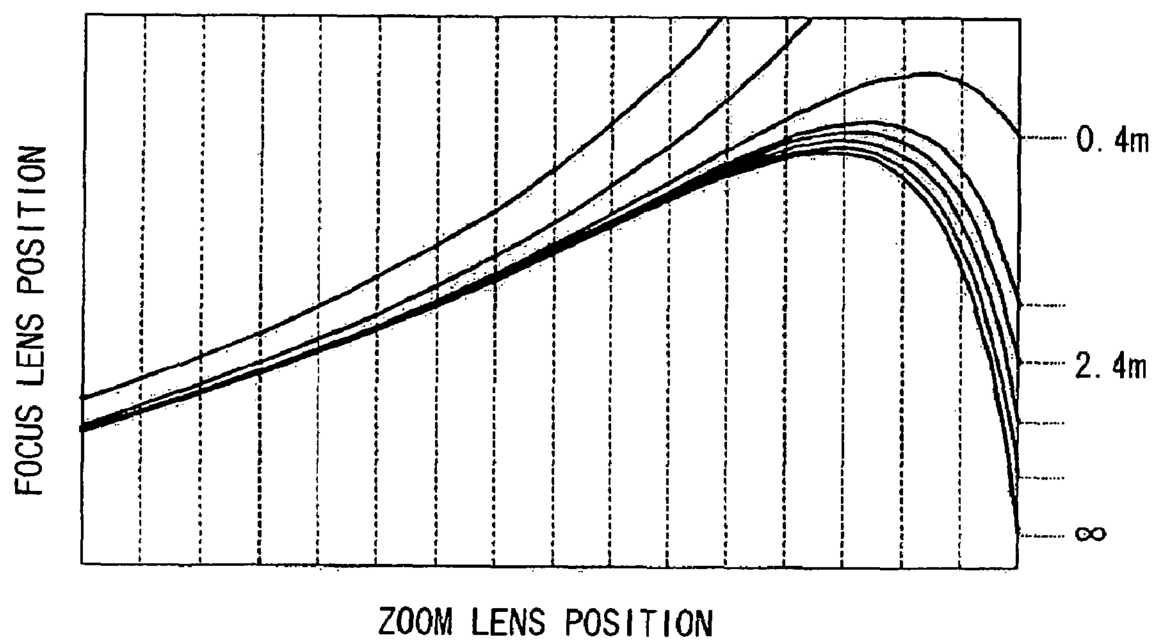
FIG. 4 shows a focus cam track of a rear focus zoom lens.

Herein, the determination of the object distance will be described by using FIG. 4. FIG. 4 shows a cam track of a rear focus zoom lens used in a video camera. The rear focus zoom lens takes on a role in a compensator lens which corrects the change on the focus surface according to the movement of a magnification varying lens. Therefore, the focus lens position in each of the object distance changes according to the position of the magnification varying lens as shown in FIG. 4.

As is observed from FIG. 4, the object distance can be hardly determined by the focus lens position at a wide side (a left side in a horizontal axis of FIG. 4). However since a position difference of the focus lens to the object distance appears comparatively great near the telephoto end, the object distance can be determined by observing the focus lens position.

As well, the determination of the object distance is not limited thereto, and for instance, information or the object distance may be obtained based on the position of the magnification varying lens and the position of the focus lens which is performed in-focusing determination by the focus detection calculation. The object distance information may be obtained by measuring the distance to the object using a triangulation ranging method.

When the focal length information is information obtained by corresponding to the position of the magnification varying lens, the information may be used.

Figure 5:
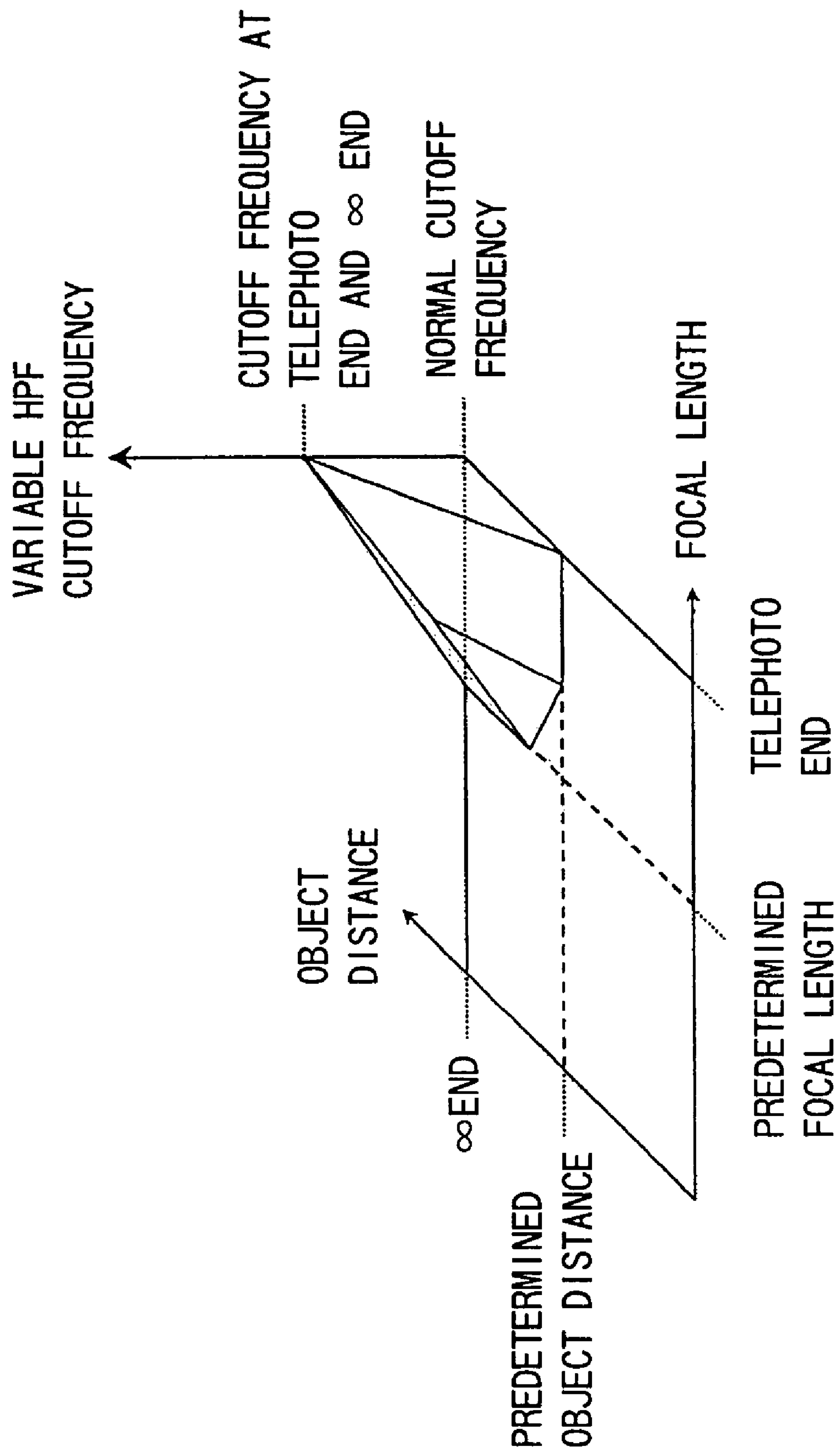
FIG. 5 shows the relationship between the focal length and the object distance, and the cutoff frequency in Embodiment 1.

Returning to FIG. 3, when it is determined that the object distance is greater than a predetermined value in step S202, the process proceeds to step S203, and in step S203, the target value of the cutoff frequency of the cutoff variable HPF 117 corresponding to the focal length and object distance is set. Herein, as the cutoff frequency, the value shown in FIG. 5 is set.

In face, when the focal length and the object distance are respectively longer than that of a predetermined value (a predetermined focal length and a predetermined object distance), the cutoff frequency is gradually increased as the focal length and the object distance are longer. Also, the cutoff frequency set at the telephoto end and at the infinity (∞) end becomes maximum.

However, the maximum cutoff frequency set here cuts a very low frequency component, and the frequency band region of approximately 6 Hz to 10 Hz which is an original hand shake component is set so as to be made to pass as much as possible. In Embodiment 1, when the focal length and the object distance are respectively shorter than that of a predetermined value, approximately 0.1 Hz is assumed as a normal cutoff frequency, approximately 1.5 Hz is assumed as the maximum cutoff frequency. The cutoff frequency corresponding to the focal length and the object distance is read out from a data table stored in a ROM in the microcomputer 119.

Figure 15:
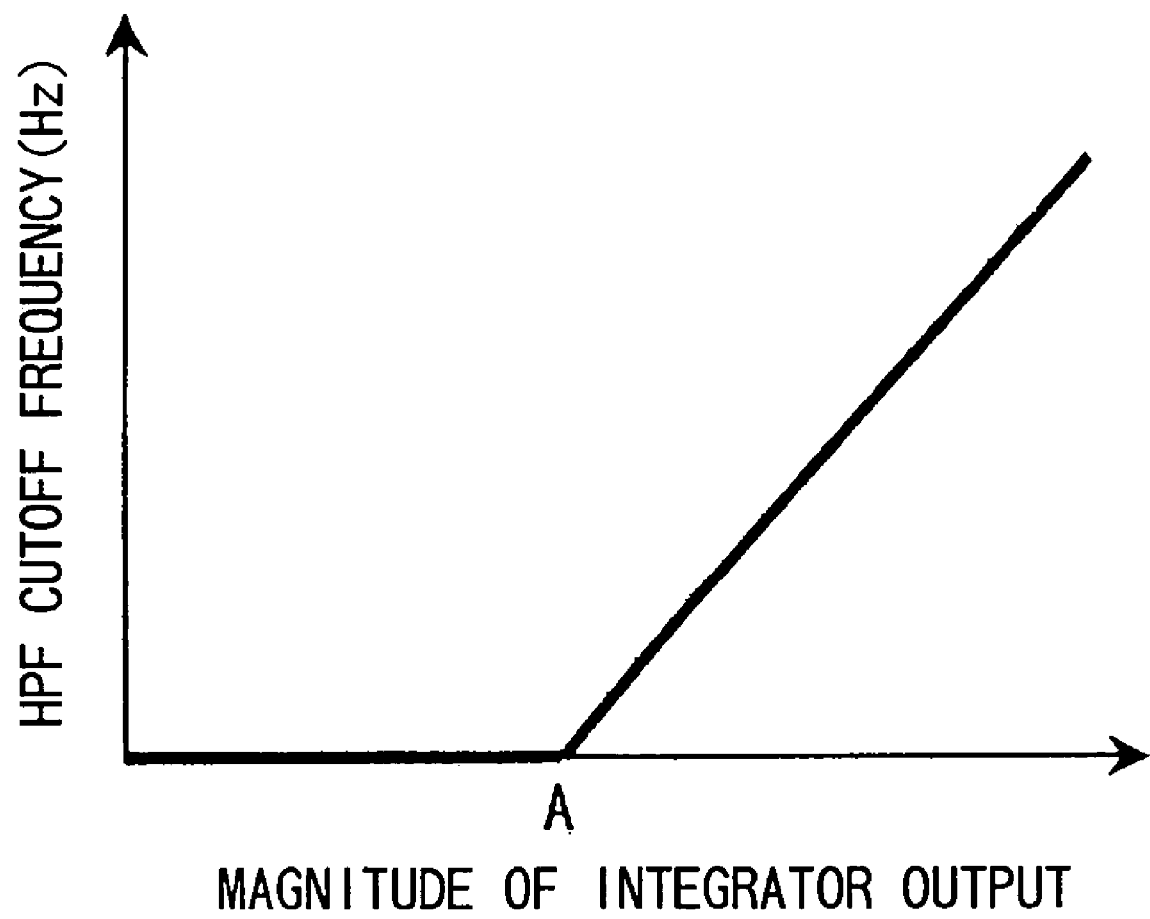
FIG. 15 shows the change in the cutoff frequency during panning control.

On the other hand, when the focal length is shorter than the predetermined value, or the focal length is greater than the predetermined value and is shorter than the predetermined value, step S204 proceeds. A normal cutoff frequency, that is, the cutoff frequency shown in FIG. 15 is set as a target value of the cutoff frequency of cutoff variable HPF 117.

And then, step S1104 is performed in FIG. 2A and the panning is determined. Herein, it is determined whether it is in a panning state or a tilting state, and the target value of the cutoff frequency of cutoff variable HPF 117 is set as a panning control in the panning state or the tilting state.

In the following step S1105, an actual cutoff frequency is set from two cutoff frequency target values to cutoff variable HPF 117 set in steps S1103 and S1104.

Figure 6:
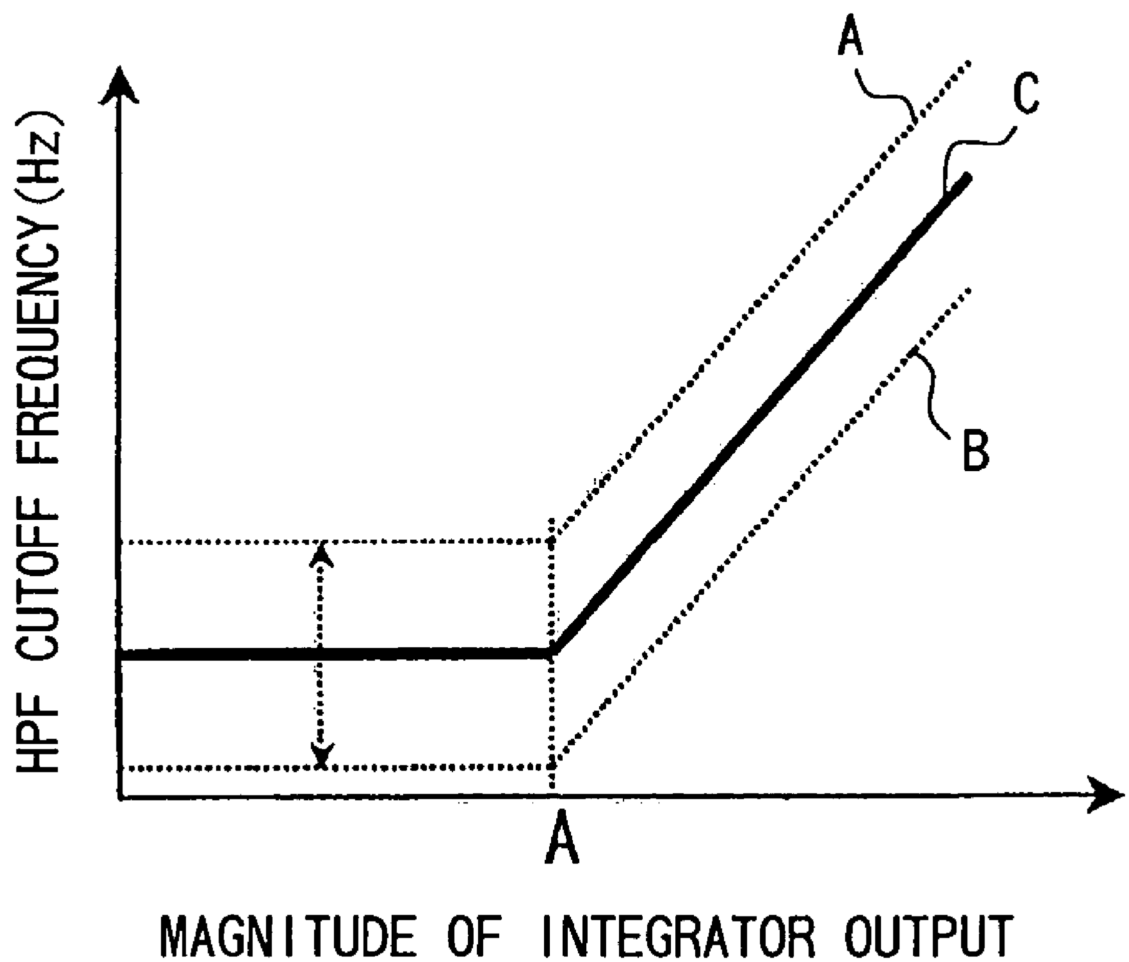
FIG. 6 shows the relationship between the output of an integrator in Embodiment 1 and the cutoff frequency.

Herein, the example of change of the above mentioned cutoff frequency including the panning control is shown in FIG. 6. Reference A in FIG. 6 shows the cutoff frequency set in a case where the focal length is the maximum (telephoto end) and the object distance is infinity, and reference B in FIG. 6 shows the cutoff frequency set in a case where the focal length is a predetermined value and the object distance is a predetermined value. And the cutoff frequency corresponding to the focal length (from predetermined value to the telephoto end) and the object distance (from predetermined value to infinity) is set within the variable range of the cutoff frequency (see C in FIG. 6). Thus, in the case where the focal length is greater than a predetermined value and the object distance is greater than a predetermined value, by setting the cutoff frequency at high than at the normal controlling shown in FIG. 15 (that is, in the case where the focal length is shorter than a predetermined value and the object distance is shorter than a predetermined value), the followup performance to the object at the panning is increased. Also, the object followup performance is optimized by changing the cutoff frequency according to the focal length and the object distance (that is, the longer the focal length and the object distance, the higher the cutoff frequency is).

The cutoff frequency set in step S1105 of FIG. 2A is set as a target value of the cutoff frequency of the cutoff variable HPF 117 in step S1124 of FIG. 2B, and the change in an actual cutoff frequency is gradually performed. For instance, when the cutoff frequency is changed to 0.9 Hz from 0.1 Hz, the cutoff frequency is changed by 0.05 Hz during one vertical synchronizing period. Thereby, the change in the filter output due to the change in the cutoff frequency is invisible.

In next step S1106, the ON/OFF setting of the image-shake correction (image stabilizing) is performed based on information which set by using an external switch or the like (not shown), and in following step S1107, a correction of an image-shake correction target value due to the focal length is performed. The reason for this is that the size of the segmented area from the entire image pick-up area (the reading area of the signal from CCD) for correcting the image-shake is calculated on the focal length×tan θ (θ is a correction angle).

In step S1108, selection processing of the image-shake correction target value is performed. Though calculation of the image-shake correction target value is performed at the interruption cycle of the processing shown in FIG. 2B, an actual image-shake correction is performed at the cycle of a vertical synchronizing period of the television signal. Then, a selection processing is performed whether the image-shake correction target value obtained by which the interruption processing of the interruption counter value is used. For instance, the image-shake correction target value is selected responding to a shutter speed, and the image stabilizing characteristic at each of the shutter speed becomes the best. Also, the image-shake correction target value is fixed such that the center of the segmented area corresponds to the center of entire image pick-up area in a case where the image stabilizing ON/OFF setting (S1106) is in an off state. Finally, the segmented data which is the image-shake correction target value is set to the CCD drive circuit 104 and the memory control circuit 107 in step S1109.

By the above processing, in the case where the focal length and the object distance are respectively longer than a predetermined distance and a predetermined object distance, the cutoff frequency is set at high in comparison to the case where they are shorter than the predetermined value (not the filter characteristic shown in FIG. 15 but the filter characteristic shown in FIG. 6 is set by the cutoff variable HPF 117 of FIG. 1). Furthermore, the cutoff frequency is increased as the focal length is longer than a predetermined focal length or as the object distance is long. As a result, the user can take a picture without feeling discomfort since the movement of an unnatural image can be avoided when the panning is performed (in other words, the followup performance to the moving object is excellent).

In Embodiment 1, the determination of the in-focusing state is not performed. When the in-focusing is not performed, it is hard to grasp the movement of the image if the image stabilizing operation has trouble. In addition, since the change in the cutoff frequency is smoothly performed, the cutoff frequency is not rapidly changed according to a large movement of the focus lens. Therefore, a problem does not particularly occur.

Embodiment 2

Figure 7:
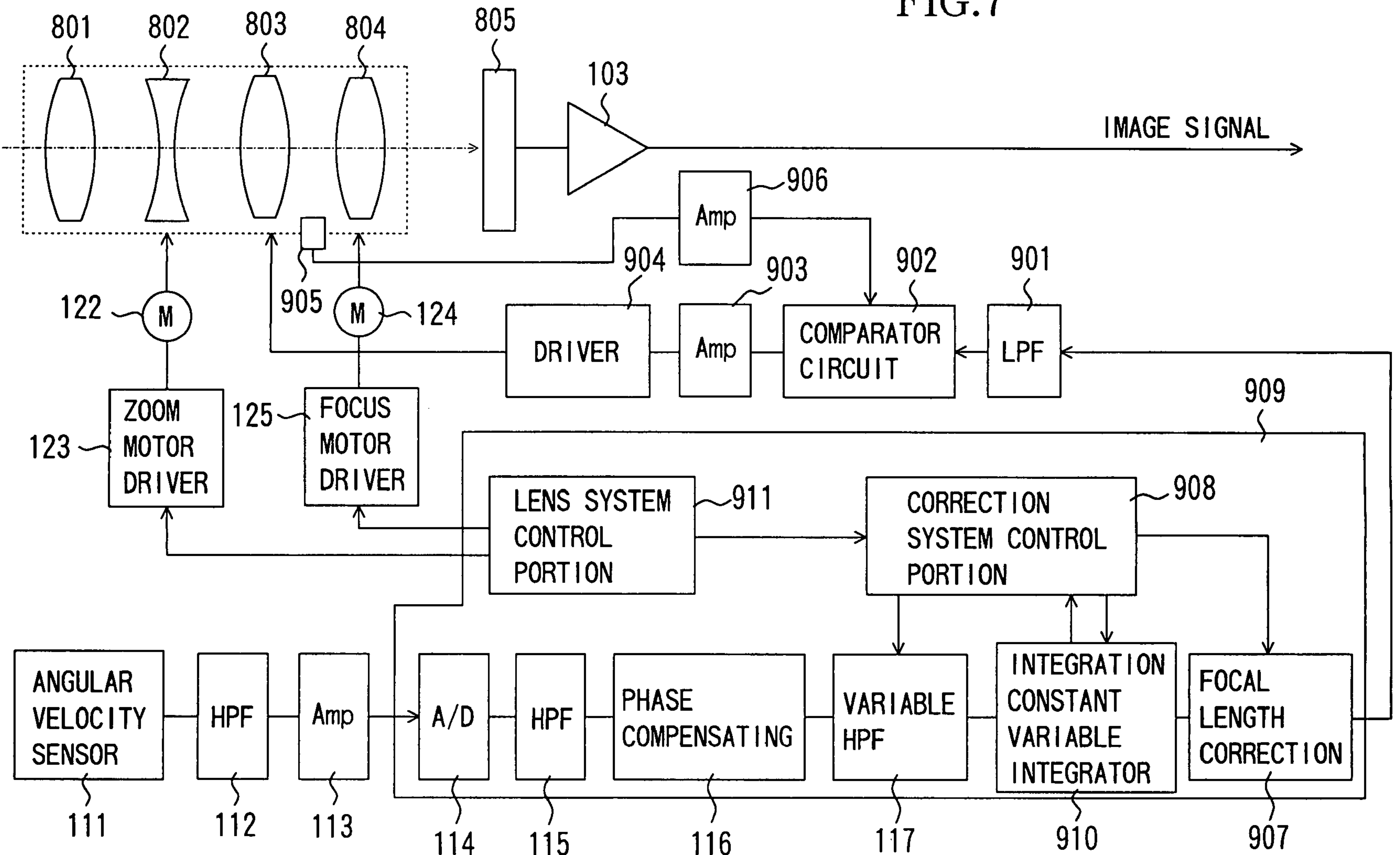
FIG. 7 shows a block diagram of a structure of an image-taking apparatus according to Embodiment 2 of the present invention.

FIG. 7 shows a block diagram of a circuit structure of an image-taking apparatus according to Embodiment 2 of the present invention. In the drawings, structural elements identical to FIG. 1 will be referred to with identical numerals thereof description will be omitted.

In Embodiment 2, an optical image-shake correction is performed. The change in the filter characteristic according to the focal length and the object distance changes the time constant (integration constant) of the integrator. Detection of the object distance is performed in a case where the focus lens is near the in-focusing position.

In FIG. 7, Reference numeral 901 denotes a lowpass filter (LPF) for applying D/A conversion to the shake correction signal given by the PWM signal or the like from the microcomputer 909. Reference numeral 902 denotes a comparator circuit, and Reference numeral 903 denotes an amplifier respectively. Reference numeral 904 denotes a driver for driving a shift lens 803 of the image-taking optical system described later, and Reference numeral 905 denotes a sensor for detecting the position of the shift lens 803. Reference numeral 906 denotes an amplifier for amplifying an output of the sensor 905. Reference numeral 910 denotes an integrator which can change the integration constant. Reference numeral 907 denotes a focal length correction portion which corrects output data according to the focal length to the output of the integrator 910. Reference numeral 908 denotes a correction system control portion, and Reference numeral 911 denotes a lens system control portion including a focusing determining portion.

Figure 14:
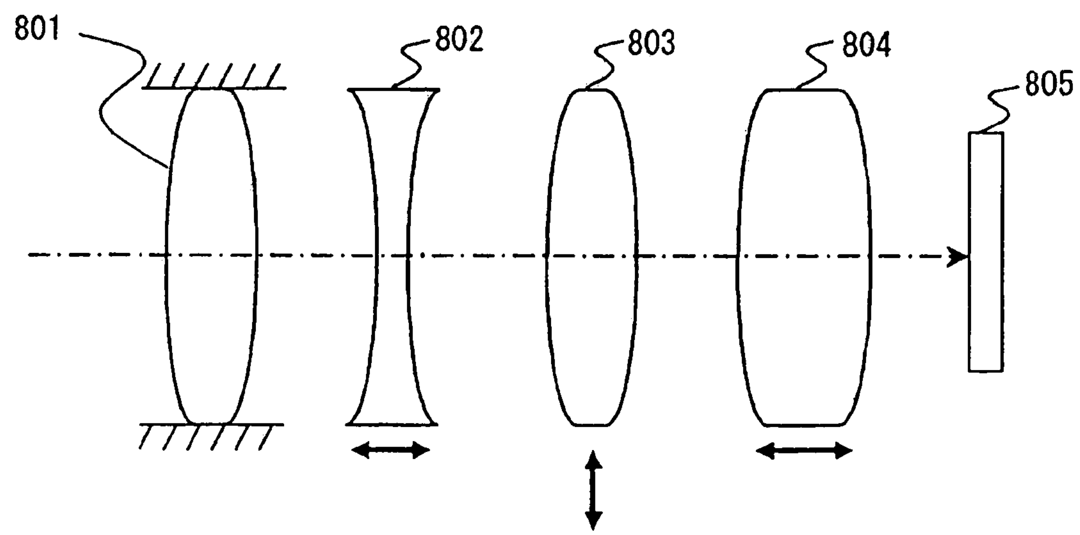
FIG. 14 shows the structure of an image-taking optical system correcting an optical image-shake.

FIG. 14 shows the structure of an image-taking optical system shown in FIG. 7. Reference Numeral 801 denotes a first lens unit (a fixed lens) fixed to a lens barrel (not shown). Reference Numeral 802 denotes a second lens unit which is movable in the optical axis direction and performs magnification varying. Reference Numeral 803 denotes a third lens unit (shift lens) which is movable in substantially orthogonal direction to the optical axis and makes an optical axis eccentric. Reference Numeral 804 denotes a fourth lens unit (focus/compensator lens) which moves in the optical axis direction and corrects the movement of the focus surface by focus adjustment and magnification varying. Reference Numeral 805 denotes a solid-state image-pickup device. In this method, the shift lens 803 is vertically or laterally moved according to the output of an angle sensor 111 which is a shake detector to correct the image-shake.

Figure 9:
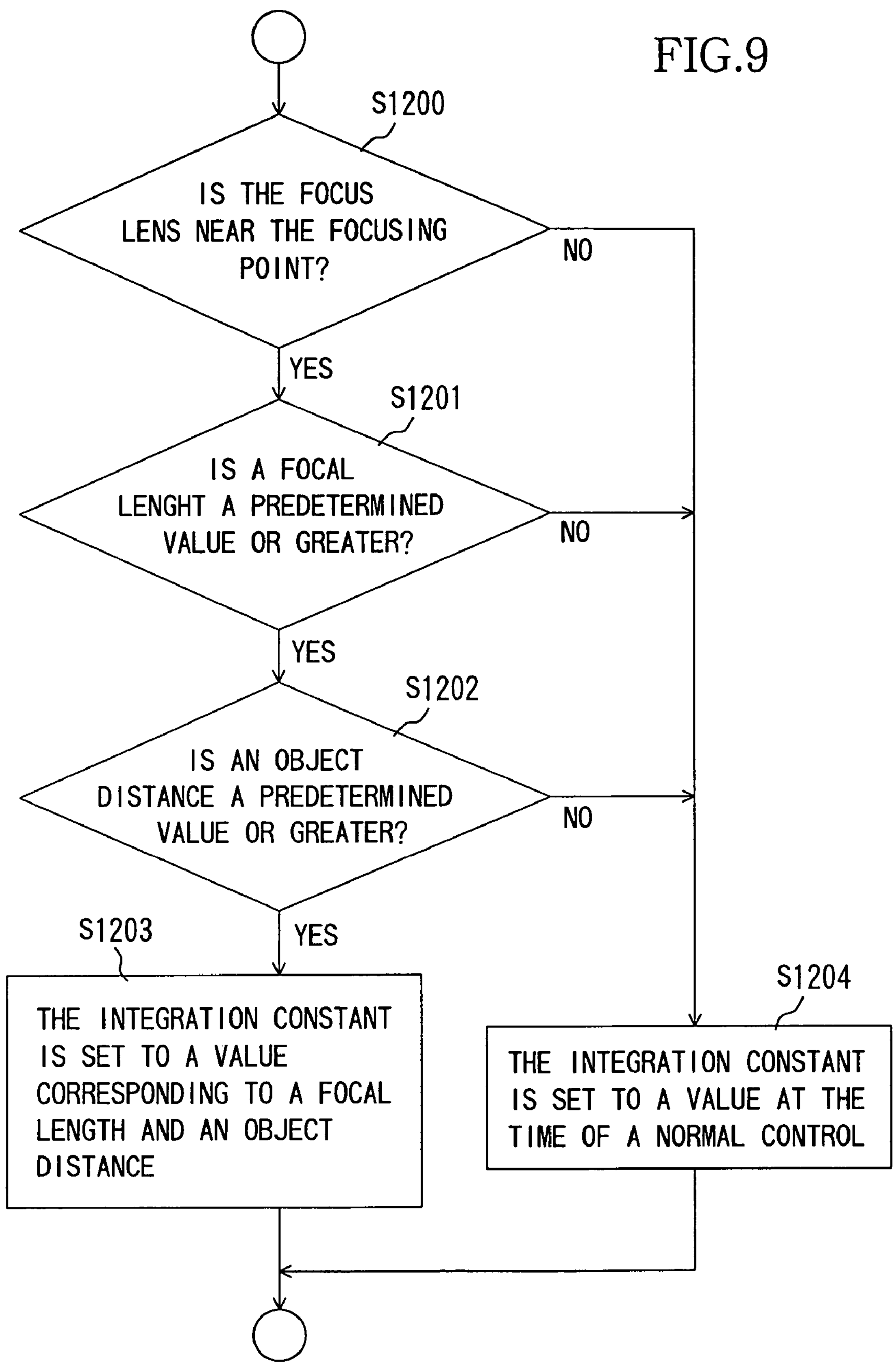
FIG. 9 shows a flowchart of a lens state determination operation executed in step S1403 of FIG. 8A.

FIGS. 8A and 8B show flowcharts of an optical image stabilizing control executed in a microcomputer 909 in Embodiment 2. FIG. 9 is a flowchart showing the change operation of the filter characteristics (integration constant) due to the focal length and object distance executed in the operation of FIGS. 8A and 8B.

Steps S1400 to S1406 of FIG. 8A show a main processing and steps S1421 to S1429 of FIG. 8B show an interruption processing.

The main processing here is performed once during the vertical synchronizing period of the television signal just like Embodiment 1.

First, when power is supplied to the image-taking apparatus in step S1400, an initial setting is performed. Herein, setting such as an interruption cycle is performed. It is determined whether an interruption counter attains a set value in the next step S1401. A wait processing is to be performed in step S1401 until the interruption processing of a predetermined number is performed.

Although the interruption processing is influenced by the processing performance of the microcomputer 909, the interruption processing is performed by timers of 900 Hz or 480 Hz just like Embodiment 1. The frequency is set so as to synchronize with the main processing performed once during the vertical synchronizing period.

In the interruption processing of FIG. 8B, first, the output signal of the angular velocity sensor 111 is taken by the HPF 115 shown in FIG. 7 in step S1421. An HPF calculation is performed by the HPF 115 shown in FIG. 7 in the following step S1423, and a phase compensating filter calculation is performed by a phase compensating filter 116 shown in FIG. 7 in the following step S1423.

An HPF calculation which changes the cutoff frequency if necessary by the cutoff variable HPF 117 shown in FIG. 7 is performed in step S1424, and the integration calculation is performed with the integrator 910 shown in FIG. 7 in the following step S1425.

In the following step S1426, the correction calculation due to the focal length is performed by a focal length correction portion 907 shown in FIG. 7. The output data is switched according to the setting state of the image stabilizing ON/OFF set in step S1406 described later in the following step S1427. Particularly, when the image stabilizing is "ON", the output data of step S1425 is set. When image stabilizing is "OFF", a center position data is set such that the optical axis of the shift lens 803 coincides with the optical axis of the image-taking optical system. The data set in step S1427 is output as PWM signal (a shake correction signal) in the following step S1428. In the last step S1429, the number of interruption processing is counted, and the interruption processing is ended.

When the above interruption processing is executed by a predetermined number which is previously set, in the main processing, the process proceeds to step S1402 from step S1401 and the interruption counter is cleared. The state of the lens is determined in the following step S1403 The processing in step S1403 is a processing shown in FIG. 9.

It is determined whether a focus lens 804 is near the in-focusing point in step S1200 in FIG. 9. This determination may be performed from the driving information of the focus lens 804 and the in-focusing information or the like in the lens system control part 911, or may be performed from an output of an AF evaluation value signal generating circuit (not shown) (An AF evaluation value signal is a high frequency component extracted from the image signal). When the focus lens 804 is near the in-focusing point, it will be considered that the object distance is decided. Therefore, the process proceeds to step S1201, and it is determined whether the focal length of the image-taking optical system is greater than a predetermined value (a first predetermined value). As a result, if the focal length is greater than the predetermined value, the process proceeds to step S1202, and it is determined whether the object distance is greater than the predetermined value (a second predetermined value). Here, when it is determined that the object distance is greater than the predetermined value, it proceeds to step 1203, and the target value of the integration constant of an integrator 910 corresponding to the focal length and the object distance is set.

Figure 10:
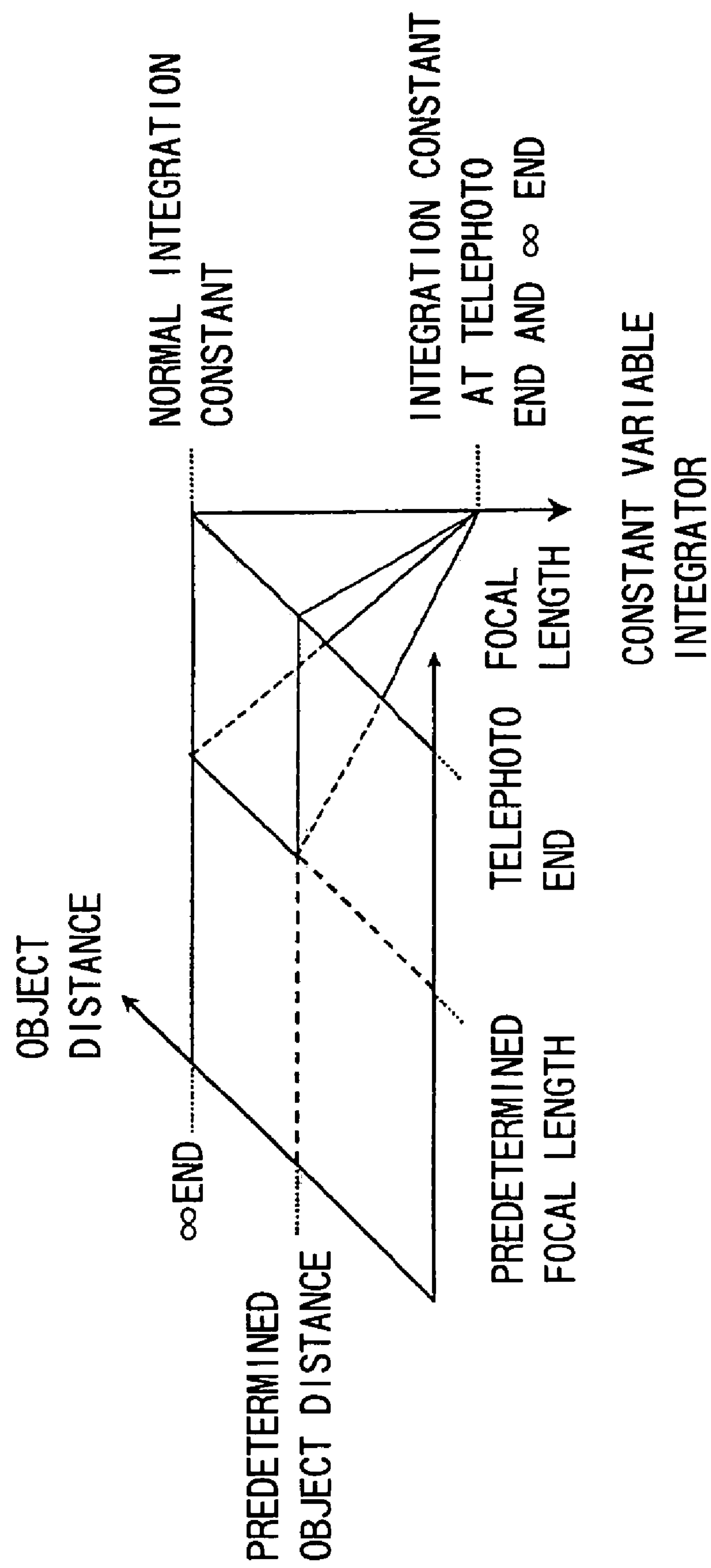
FIG. 10 shows the relationship between the focal length and the object distance, and the integration constant in Embodiment 2.

The integration constant herein, for example, is set to the value shown in FIG. 10. That is to say, in the case where the focal length and the object distance are greater than a predetermined value (a predetermined focal length and a predetermined object distance), the integration constant is gradually lowered, and the integration constant which set at a telephoto end and an infinite (∞) end is minimized. However, the minimum integration constant set here cuts a low frequency component, and the frequency band region of approximately 6 Hz to 10 Hz which is an original hand shake component is set so as to be passed as much as possible.

On the other hand, when the focus lens is not near the in-focusing point, and the focal length and the object distance are smaller than a predetermined value, the process proceeds to a step S1204, and the normal integration constant is set as a target value of the integration constant of the integrator 910.

Afterwards, the process proceeds to a step S1404 of FIG. 8A and the panning determination is performed. Herein, it is determined whether it is in a panning state or a tilting state. If it is in the panning state or tilting state, the target value of the cutoff frequency of cutoff variable HPF 117 is set as the panning control just like Embodiment 1. In the following step S1405, it is set the cutoff frequency to cutoff variable HPF 117 set in step S1404 and is set the integration constant to the integrator 910 set in step S1403.

The cutoff frequency and integration constant set by the process of step S1405 are set to the HPF calculation in step S1424 and the integration calculation in step S1425 as a target value, and the change of the set to the target value is gradually performed just like Embodiment 1.

Finally, the image stabilizing ON/OFF is set in step S1406 based on information set by an external switch (not shown) or the like.

By the above processing in a case where the focus lens is driven near the focusing, the time constant (integration constant) of the integrator 910 is changed according to the focal length and the object distance. Thereby, when the focal lengths are particularly longer than a predetermined focal length and the object distance is longer than a predetermined object distance, the filter is set such that the followup performance to the object is improved. Therefore, the photographer can shoot without feeling discomfort.

Embodiment 3

Next, an image-taking apparatus according to Embodiment 3 of the present invention will be described. In Embodiment 3, a single-lens reflex camera will be described, in which an image stabilizing system is composed by mounting an angular velocity sensor in a camera body.

Figure 11:
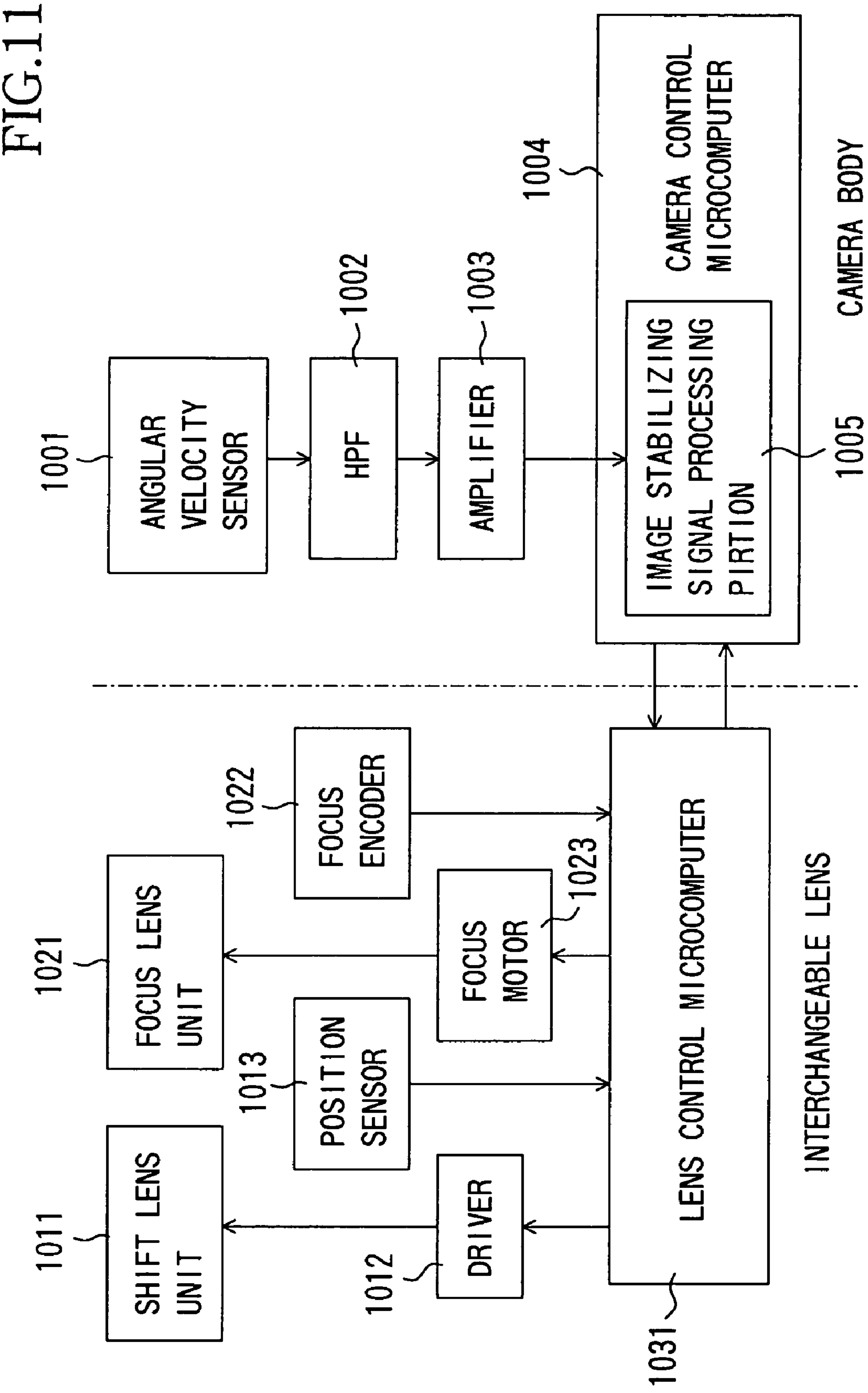
FIG. 11 shows a block diagram of a schematic structure of an image-taking apparatus (single-lens reflex camera) according to Embodiment 3 of the present invention.

FIG. 11 is a block diagram showing a circuit structure of the single lens reflex digital camera according to Embodiment 3. In FIG. 11, the right side of the alternate long and short dash lines shows a camera main body, and the left side shows an interchangeable lens (lens apparatus that can be detachably attached to the camera body).

At the camera body side, Reference Numeral 1001 denotes an angular velocity sensor, Reference Numeral 1002 denotes HPF, Reference Numeral 1003 denotes an amplifier, Reference Numeral 1004 denotes a camera control microcomputer which controls the entire camera, and Reference Numeral 1005 denotes a signal processing portion which is provided in the camera control microcomputer 1004 for the image-shake correction. An image-pickup device (not shown) such as a CCD sensor and a CMOS sensor is provided in a camera body.

At the interchangeable lens side, Reference Numeral 1031 denotes a lens control microcomputer incorporated in the interchangeable lens, Reference Numeral 1011 denotes a shift lens unit which performs a optical image-shake correction of the image-taking optical system (see FIG. 14) which the interchangeable lens has. Reference Numeral 1012 denotes a driver which drives the shift lens 1011.

Reference Numeral 1013 denotes a position sensor for detecting the movement of the shift lens unit 1011, and the shift lens unit 1011 is driven based on the driving instruction from the camera control microcomputer 1004 and the information from the position sensor 1013.

Reference Numeral 1021 denotes a focus lens unit, and Reference Numeral 1023 denotes a focus motor which drives the focus lens unit 1021.

Reference Numeral 1022 denotes a focus encoder which detects the position of the focus lens unit. The lens control microcomputer 1031 drives the focus lens unit 1021 via the focus motor 1023 by the driving instruction from the camera control microcomputer 1004. The lens control microcomputer 1031 takes the lens position information from the encoder 1022, and transmits the information to the camera control microcomputer 1004.

Figure 12:
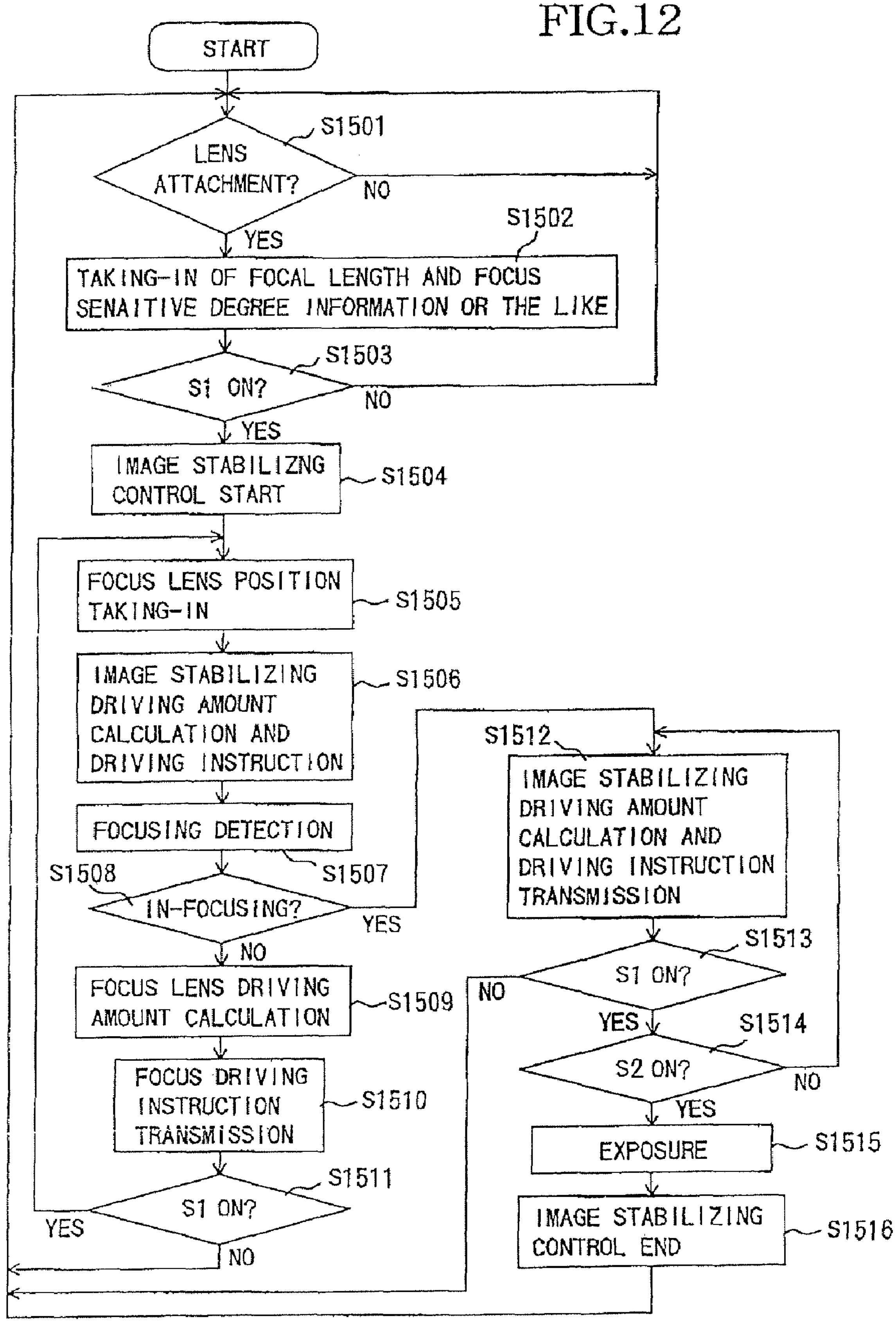
FIG. 12 shows a flowchart of an operation in the image-taking apparatus according to Embodiment 3.

FIG. 12 shows a part which mainly relates to the image-shake correction control of flowcharts of the program executed in the camera control microcomputer 1004 and the lens control microcomputer 1031.

When power supply of the camera body is turned on and the program starts, the camera control microcomputer 1004 determines whether the interchangeable lens is attached to the camera body in step S1501. When the interchangeable lens is attached to the camera body, the lens control microcomputer 1031 sends the focal length information of the image-taking optical system, the focus sensitive degree information and the open F value information or the like to the camera control microcomputer 1004 by transmission in the following step S1052. In the following step S1503, the camera control microcomputer 1004 detects the half pressing state (ON state of a switch S1) of a shutter button provided in the camera body. If the switch S1 is turned off, similar operation is repeated in step S1501.

On the other hand, if the switch S1 is turned on, the camera control microcomputer 1004 proceeds to a step S1504, and the image-shake correction control is started. Herein, the power supply is supplied to the circuit section of 1001 to 1003 of FIG. 11 such as the angular velocity sensor.

Next, the camera control microcomputer 1004 takes focus lens position information from the lens control microcomputer 1031 in step S1505. The driving amount for the image-shake correction of the shift lens unit 1011 is calculated in the following step S1506, and the driving instruction is transmitted to the lens control microcomputer 1031.

The driving amount calculation of the shift lens unit 1011 includes taking the shake signal described in Embodiment 1 and Embodiment 2, sets operation of the target value of the shake correction amount, and the setting operation of the filter characteristic such as the cutoff frequency and the integration constant corresponding to the focal length and the object distance.

Then, the camera control microcomputer 1004 proceeds to a step S1507, and the focus detection is performed based on the information from an AF sensor (not shown) provided in the camera body. In the following step S1508, the in-focusing determination is performed. The process proceeds to a step S1509 if not in-focusing, and the drive amount of the focus lens unit 1021 is calculated from the information of an AF sensor and the focus sensitive information or the like. In the following step S1510, the driving instruction of the focus lens unit 1021 is transmitted to the lens control microcomputer 1031.

It is determined whether the shutter button is in a half pressed state (the switch S1 is turned on) in the following step S1511, and returns to step S1501 when the switch S1 is turned off.

When the switch S1 is turned on, steps S1505 to S1511 are repeated until the in-focusing is determined in step S1508. And then, when in-focusing is determined in step S1508, the camera control microcomputer 1004 proceeds to step S1512, and camera control microcomputer 1004 calculates the image-shake correction drive amount and transmits the driving instruction again. It is checked again whether the switch S1 is turned on in the following step S1513. If the switch S1 is turned on, the process proceeds to a step S1514. The image-shake correction control is always performed by repeating steps S1512 to S1514 until the shutter button is fully depressed (switch S2 is turned on).

Afterwards, when the switch S2 is turned on, and the process proceeds to step S1515, the exposure operation is performed. The power supply to the angular velocity sensor 1001 or the like is turned off in the following step S1516, and the image-shake correction control is ended.

Since the information of the focal length and the information of the object distance are obtained by communication with the lens control microcomputer 1031 in the driving amount calculation processing in steps S1506 and S1512 in Embodiment 3, the condition where the focal lengths are longer than a predetermined focal length and that the object distance is further than a predetermined object distance can be determined. Therefore, the filter characteristic such as the cutoff frequency and the integration constant can be changed just like Embodiments 1 and 2.

Therefore, when a single focus lens is attached to the camera body, for example, the focal length of the lens is 1200 mm, and the information of the object distance at focusing is further than a predetermined object distance, the cutoff frequency is increased (the characteristic shown in FIG. 15 is changed to the characteristic shown in FIG. 6), and the integration constant is lowered. Thereby, the followup performance can be optimally set to the object during an image-taking is performed with the panning. As a result, the movement of the image by the image-shake correction function without the feeling discomfort of the user can be obtained.

When the zoom lens is attached, the focal length information detected by a zoom encoder (not shown) is taken into the camera control microcomputer 1004. Therefore, the cutoff frequency and the integration constant can be changed based on the information of the focal length and the information of the object distance. In this case, the image-taking without the feeling discomfort at the long focus side can be performed.

As described above, according to the embodiments, the movement of an unnatural image by the image-shake correction function can be avoided, and the user can perform the image-taking and observation without feeling discomfort.

Though the optical apparatus driving the shift lens orthogonal to the optical axis direction for the optical image-shake correction is described in Embodiments 2 and 3, the optical image-shake correction is not limited to the above method. For instance, the vertex angle of a variable angle prism may be changed, and the lens may be turned around an optical axis point. The image-pickup device may be shifted orthogonal to the optical axis direction.

Though the microcomputer which performs the image-shake correction control is mounted in the camera body providing the shake detector in the single-lens reflex camera wax in Embodiment 3, the present invention can be applied to the case where the shake detector and the microcomputer performing the image-shake correction control are mounted in the interchangeable lens, and the case where the shake detector is mounted in the interchangeable lens and the microcomputer performing the image-shake correction control is mounted in the camera body. Also, the present invention can be applied to the case where the shake detector is mounted in the camera body and the microcomputer performing the image-shake correction control is mounted in the interchangeable lens.

In addition, though the image-taking apparatus providing the image-shake correction function is described in the Embodiments, the present invention can be applied to an observation apparatus such as binoculars providing the image-shake correction function While preferred embodiments have been described, it is to be understood that modification and variation of the present invention may be made without departing from the scope of the following claims.

"This application claims priority from Japanese Patent Application No. 2003-325864 filed on Sep. 18, 2003, which is hereby incorporated by reference herein."

What is claimed is:

1. An optical apparatus comprising:

a shake detection unit configured to detect shaking of the optical apparatus;

a filter configured to cut a specific frequency component included in an output from the shake detection unit;

a correction unit configured to correct shaking of an image taken through an image-taking optical system based on a signal passed through the filter;

a focal length detection unit configured to detect information on a focal length of the image-taking optical system;

an object distance detection unit configured to detect information on an object distance which is a distance to an object whose image is taken through the image-taking optical system; and a change unit configured to change a frequency of the specific frequency component cut by said filter such that the frequency increases as the focal length increases and as the object distance increases.

2. The optical apparatus according to claim 1, wherein the change unit is configured to change the frequency of the specific frequency component cut by the filter such that the frequency increases as the focal length increases and as the object distance increases when the focal length is longer than a predetermined focal length and the object distance is longer than a predetermined object distance.

3. The optical apparatus according to claim 1, wherein the image-taking optical system includes a zoom lens movable in a zoom operation, and wherein the focal length detection unit is configured to detect the information on the focal length based on a position of the zoom lens.

4. The optical apparatus according to claim 1, wherein the image-taking optical system includes a focus lens movable in a zoom operation, and wherein the object distance detection unit is configured to detect the information on the object distance based on a position of the focus lens.

5. The optical apparatus according to claim 1, further comprising:

an image-pickup device configured to photoelectrically convert an object image formed by the image-taking optical system, and wherein the correction unit is configured to perform electrical image shake correction using a signal from the image-pickup device.

6. The optical apparatus according to claim 1, wherein the correction unit is configured to perform optical image shake correction.

7. An optical apparatus comprising:

a shake detection unit configured to detect shaking of the optical apparatus;

an integrator configured to perform integration processing on an output from the shake detection unit;

a correction unit configured to correct shaking of an image taken through an image-taking optical system based on a signal from the integrator;

a focal length detection unit configured to detect information of a focal length of the image-taking optical system;

an object distance detection unit configured to detect information on an object distance which is a distance to an object whose image is taken through the image-taking optical system; and a change unit configured to change an integration constant of the integrator such that the integration constant decreases as the focal length increases and as the object distance increases.

8. The optical apparatus according to claim 7, wherein the change unit is configured to change the integration constant of the integrator such that the integration constant decreases as the focal length increases and as the object distance increases when the focal length is longer than a predetermined focal length and the object distance is longer than a predetermined object distance.

9. The optical apparatus according to claim 7, wherein the image-taking optical system includes a zoom lens movable in a zoom operation, and wherein the focal length detection unit is configured to detect the information on the focal length based on a position of the zoom lens.

10. The optical apparatus according to claim 7, wherein the image-taking optical system includes a focus lens movable in a zoom operation, and wherein the object distance detection unit is configured to detect the information on the object distance based on a position of the focus lens.

11. The optical apparatus according to claim 7, further comprising:

an image-pickup device configured to photoelectrically convert an object image formed by the image-taking optical system, and wherein the correction unit is configured to perform electrical image shake correction using a signal from the image-pickup device.

12. The optical apparatus according to claim 7, wherein the correction unit is configured to perform optical image shake correction.

13. An optical apparatus comprising:

a shake detection unit configured to detect shaking of the optical apparatus;

a filter configured to cut a specific frequency component included in an output from the shake detection unit;

a correction signal outputting unit configured to output a correction signal for correcting shaking of an image taken through an image-taking optical system based on a signal passed through the filter;

a focal length information obtaining unit configured to obtain information on a focal length of the image-taking optical system;

an object distance information obtaining unit configured to obtain information on an object distance which is a distance to an object whose image is taken through the image-taking optical system; and a change unit configured to change a frequency of the specific frequency component cut by the filter such that the frequency increases as the focal length increases and as the object distance increases.

14. The optical apparatus according to claim 13, wherein the change unit is configured to change the frequency of the specific frequency component cut by the filter such that the frequency increases as the focal length increases and as the object distance increases when the focal length is longer than a predetermined focal length and the object distance is longer than a predetermined object distance.

15. The optical apparatus according to claim 13, wherein the image-taking optical system includes a zoom lens movable in a zoom operation, and wherein the focal length information obtaining unit is configured to obtain the information on the focal length based on a position of the zoom lens.

16. The optical apparatus according to claim 13, wherein the image-taking optical system includes a focus lens movable in a zoom operation, and wherein the object distance information obtaining unit is configured to obtain the information on the object distance based on a position of the focus lens.

17. The optical apparatus according to claim 13, further comprising:

an image-pickup device configured to photoelectrically convert an object image formed by the image-taking optical system, wherein the correction signal outputting unit is configured to output the correction signal for performing electrical image shake correction using a signal from the image-pickup device.

18. The optical apparatus according to claim 13, wherein the correction signal outputting unit is configured to output the correction signal for performing optical image shake correction.

19. An optical apparatus comprising:

a shake detection unit configured to detect shaking of the optical apparatus;

a filter configured to extract a specific frequency component in an output from the shake detection unit;

a correction unit configured to correct shaking of an image taken through an image-taking optical system based on an output of the filter;

a focal length detection unit configured to detect information on a focal length of the image-taking optical system;

an object distance detection unit configured to detect information on an object distance which is a distance to an object whose image is taken through the image-taking optical system; and a controller configured to control a passing characteristics of the filter according to the focal length and the object distance.

20. The optical apparatus according to claim 19, wherein the filter is a highpass filter.

21. The optical apparatus according to claim 20, wherein the controller changes a cutoff frequency of the highpass filter according to the focal length and the object distance.

22. The optical apparatus according to claim 20, wherein the controller changes a cutoff frequency of the highpass filter when the focal length exceeds a predetermined focal length and the object distance exceeds a predetermined object distance.

23. The optical apparatus according to claim 20, wherein the controller increases a cutoff frequency of the highpass filter.

24. The optical apparatus according to claim 20, wherein the controller increases a cutoff frequency of the highpass filter when the focal length exceeds a predetermined focal length and the object distance exceeds a predetermined object distance.

25. The optical apparatus according to claim 19, wherein the image-taking optical system includes a zoom lens movable in a zoom operation, and wherein the focal length detection unit is configured to detect the information on the focal length based on a position of the zoom lens.

26. The optical apparatus according to claim 19, wherein the image-taking optical system includes a focus lens movable in a zoom operation, and wherein the object distance detection unit is configured to detect the information on the object distance based on a position of the focus lens.

27. The optical apparatus according to claim 19, further comprising:

an image-pickup device configured to photoelectrically convert an object image formed by the image-taking optical system, and wherein the correction unit is configured to perform electrical image shake correction using a signal from the image-pickup device.

28. The optical apparatus according to claim 19, wherein the coffection unit is configured to perform optical image shake correction.

* * * * *